Patented June 1, 1954

2,680,134

UNITED STATES PATENT OFFICE 2,680,134

FLUOROSULFONYLPHENYLAMIDO - 1,3 - PROPANEDIOL COMPOSITIONS AND PROCESS

Walter A. Gregory, Wilmington, Del., assignor to E. I. du Pont de Nemours and Company, Wilmington, Del., a corporation of Delaware No Drawing. Application July 2, 1952, Serial No. 296,960

7 Claims. (Cl. 260—543)

This invention relates to fluorosulfonylphenylamido-1,3-propanediols and to their preparation.

The fluorosulfonylphenylphenylamido - 1,3-propanediols of the invention are represented by the formula

1.

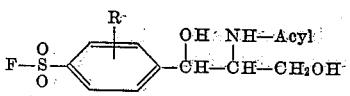

where R represents hydrogen, halogen, lower alkyl and lower alkoxy radicals and acyl represents a radical such as acetyl, chloroacetyl, bromoacetyl, dichloroacetyl, dibromoacetyl and like radicals.

The terms "lower alkyl" and "lower alkoxy" as used herein include all alkyl and alkoxy radicals containing not more than six carbon atoms.

Illustrative of the fluorosulfonylphenylamido-1,3-propanediols of my invention are:

1 - (p-fluorosulfonylphenyl) -2- (alpha,alpha-dichloroacetamido) -1,3-propanediol,
1 - (p-fluorosulfonylphenyl) -2- (alpha,alpha-dibromacetamido) -1,3-propanediol,
1 - (4 - fluorosulfonyl - 2 - methylphenyl) - 2- (alpha,alpha - dichloroacetamido) - 1,3 - propanediol,
1 - (3-chloro-4-fluorosulfonylphenyl) -2- (alpha,alpha-dichloroacetamido) -1,3-propanediol,
1 - (p - fluorosulfonylphenyl) -2- (alpha-chloroacetamido) -1,3-propanediol,
1 - p-fluorosulfonylphenyl) - 2 - (alpha-bromoacetamido) -1,3-propanediol,
1 - (p - fluorosulfonylphenyl) -2-acetamido-1,3-propanediol,
1 - (2-bromo-4-fluorosulfonylphenyl) -2- (alpha,alpha-dichloroacetamido) -1,3-propanediol,
1 - (2-fluoro-4-fluorosulfonylphenyl) -2- (alpha,alpha-dichloroacetamido) -1,3-propanediol,
1 - (4 - fluorosulfonyl-3-ethylphenyl) -2- (alpha,alpha-dichloroacetamido) -1,3-propanediol,
1 - (4 - fluorosulfonyl - 2 - methoxyphenyl) -2- (alpha,alpha - dichloroacetamido) - 1,3 - propanediol.

The compounds of the invention can be prepared from previously known organic compounds by novel syntheses which I have discovered. In these syntheses there are involved a number of new intermediate organic compounds. Certain of these new intermediate compounds and all of the compounds represented by Formula 1 may exist in optical isomeric form. Stereoisomeric forms as used herein refer to the spatial arrangement of the polar groups on the two asymmetric carbon atoms with reference to erythrose and threose. To differentiate between these two possible forms the diastereoisomeric pair related to erythrose in configuration will hereinafter be designated as the erythro series and the diastereoisomeric pair related to threose as the threo series or form.

To further designate the threo form of the compounds of my invention I have designated as the threo form the major product obtained from the aluminum isopropoxide, isopropyl alcohol reduction of the ketones of the formula

2.

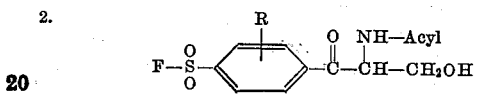

where R and acyl have the same significance as in Formula 1.

Both the threo and erythro forms exist as racemates of optically active dextro (d) and levo (l) rotatory isomers as well as in the form of the individual or separated dextro (d) and levo (l) optical isomers.

In view of the difficulty of representing the various optical isomers with plane formulas, I have used the customary structural formulas and adapted the following convention in order to designate their optical configuration, an appropriate notation is used under the formula, for example, (l-threo form, (d)-threo form, (l) - erythro form, (d)-erythro form, (dl)-threo form and the like.

It will be understood that where no notation appears with a structural formula or with a chemical name the formula or name is to be interpreted in its generic sense; that is, as representing the (d)-threo, (l)-threo isomers or (d)-erythro, (l)-erythro isomers in separated form as well as the (dl)-threo or (dl)-erythro optical racemates or the mixture of all of the isomers and racemates. In other words, a formula or name represents not only the unresolved mixture of isomers but also the individual isomers and racemates.

One of the methods for the production of the fluorosulfonylphenylamidopropanediols of the invention can be diagrammatically represented as follows:

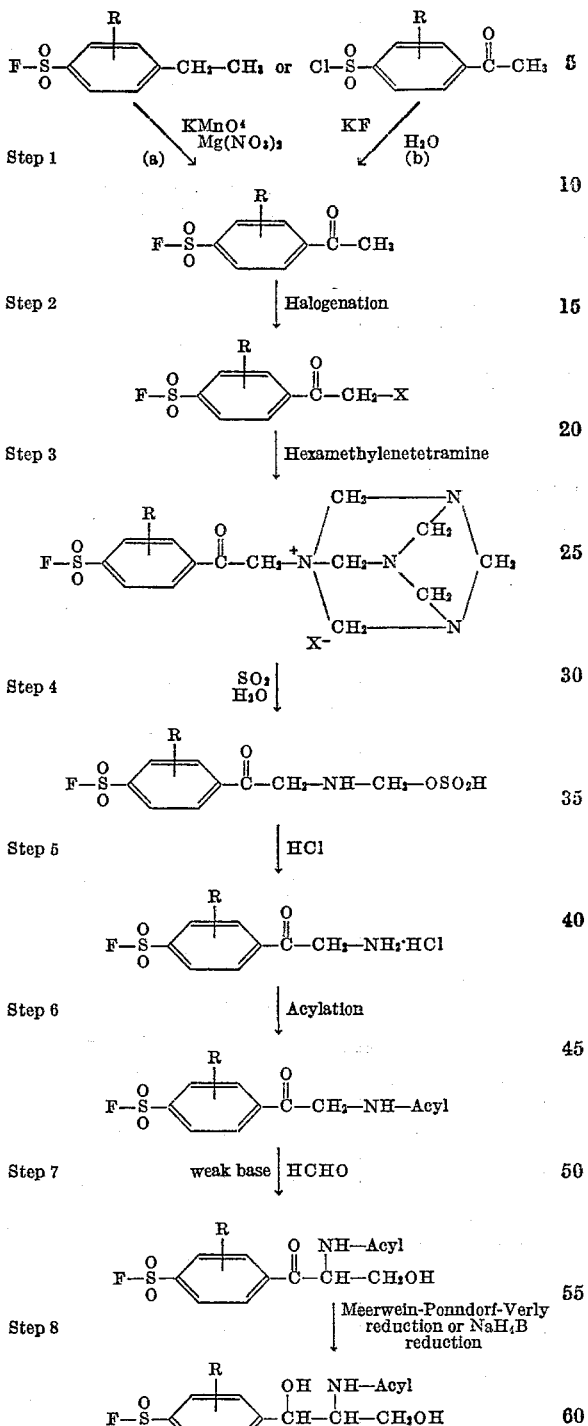

Step 1 of my general process involves preparing a compound of the formula

3.

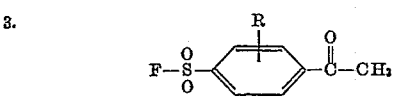

where R has the same significance as in Formula 1. The preparation of the above-shown substituted acetophenone can be accomplished by at least two different routes as will be apparent by reference to Steps 1a and 1b of the process diagram already shown.

If substep (a) is to be followed, the starting material is a substituted benzenesulfonyl fluoride of the formula

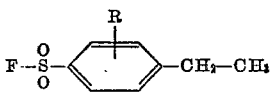

The fluoride is mixed with potassium permanganate and magnesium nitrate hexahydrate to yield the desired substituted acetophenone. It is preferred to add an acetone solution of the fluoride to an aqueous system containing the magnesium nitrate and potassium permanganate.

An alternative route of preparing the substituted acetophenone of Formula 3 involves reacting potassium fluoride in aqueous medium with a compound of the formula

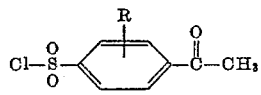

The product of Step 1 (Formula 3) is halogenated in Step 2 to give a phenacyl halide of the formula

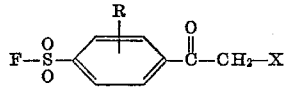

Halogenation can be carried out in a variety of ways. A preferred method is to add bromine slowly to a glacial acetic acid solution of the substituted acetophenone of Formula 3.

In the third step of my process, the phenacyl halide of Step 2 is mixed in a liquid medium such as, for instance, anisole, with hexamethylenetetramine to yield a hexamethylenetetraminium halide of formula

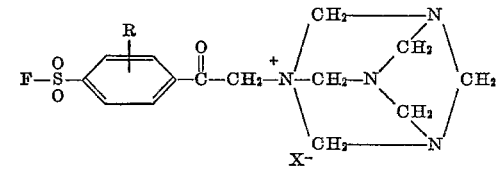

In most instances I have found it preferable to proceed directly to the sulfite of Step 4 without isolation of the hexamethylenetetraminium halide. This conversion is effected using sulfur dioxide and water. It is shown on the process diagram as Step 4.

The substituted benzenesulfonyl fluoride sulfite resulting from Step 4 can be readily converted into the corresponding hydrochloride using hydrochloric acid (Step 5).

Step 6 comprises N-acylating the amine hydrochloride compound of Step 5. This step is preferably carried out using dichloroacetyl chloride but similar acid halides or acetic anhydride in the presence of a weak base, for instance, sodium acetate, may be used.

The amide derivative produced in accordance with Step 6 of my process is then subjected to an aldol type of condensation to yield a compound having the formula

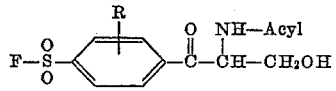

This condensation is preferably carried out in an alcoholic medium, for example, 95% ethanol or methanol, using potassium carbonate or sodium bicarbonate and an aqueous formaldehyde of 36–38% concentration.

Step 8, the final step in the process, involves a reduction of the carbonyl group of the compound produced in Step 7 to a hydroxyl group. This reduction can be effected in good yields by using either of two methods.

One method involves the use of sodium borohydride, NaH₄B. It is preferred to carry out the reduction using NaH₄B in the presence of an alcohol such as, for instance, ethanol or methanol. This method yields a mixture of (dl)-threo and (dl)-erythro forms of the fluorosulfonylphenylamidopropanediols of the invention.

The alternative method of Step 8 is referred to as the Meerwein-Ponndorf-Verly reduction. This reduction method is described by A. L. Wilds on page 203 of Chapter 5 of "Organic Reactions," volume 2, John Wiley & Sons, Inc., N. Y. (1944). This method of reduction gives mainly (dl)-threo form of the fluorosulfonylphenylamidopropanediols.

The individual threo stereoisomeric form of the fluorosulfonylphenylamidopropanediols can be resolved into their optical isomers following the completion of Step 8 and hydrolysis with a hydrohalide acid to the amine salt. This resolution can be carried out by forming an acid salt of the racemic amine of threo form with an optically active acid such as, for instance, (d)-camphor sulfonic acid, (l)-camphor sulfonic acid, (d)-tartaric acid, (l)-tartaric acid, (d)-mandelic acid and (l)-mandelic acid; by treating the hydrohalide salt with one of the above-named acids in the presence of an equivalent quantity of silver oxide or silver carbonate; separating the two diastereoisomeric products by recrystallization from a solvent such as, for instance, a lower aliphatic alcohol or mixtures of the same with water or other organic solvents; and then regenerating the individual optically active isomers from the separated diastereoisomeric addition salts by treating each one separately with caustic or with a basic ion exchange resin.

When carrying out the resolution, as set forth above, it is desirable but not essential to choose the form of the optically active acid so that the diastereoisomer of which the desired optical isomer is a part will separate from the crystallization solution first.

The compounds of the present invention are useful in the preparation of other organic compounds, such as for instance the sulfonamidophenylamido-1,3-propanediols of my copending application Serial No. 296,959, filed concurrently herewith. The compounds find further use as drugs in the control of bacterial and rickettsial infections. They are also of use in viral and fungal infections and find particular use as antibacterial agents and in the control of the growth of microorganisms.

In order to more fully understand the invention, reference should be had to the following illustrative examples:

Example 1

Preparation of (dl)-threo-1-(p-fluorosulfonylphenyl)-2-(alpha,alpha-dichloroacetamido)-1,3-propanediol

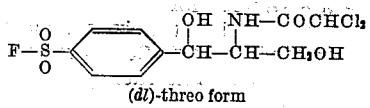

(dl)-threo form

A solution of 400 g. of p-ethylbenzenesulfonyl fluoride in 1.15 l. of acetone is added to 2.3 l. of distilled water containing 778 g. of magnesium nitrate hexahydrate and 327 g. of potassium permanganate. (Step 1a.) The mixture is heated to a temperature of 50° C. During the heating period, the mixture is stirred. At the end of 2.5 hours, 163 g. of potassium permanganate is added and the reaction is allowed to continue for a period of 3.5 hours. The excess permanganate is removed by adding slowly to the reaction mixture a saturated solution of sodium sulfite until the purple color of the mixture is discharged. The mixture is filtered with the aid of diatomaceous earth to insure removal of manganese dioxide. The filter cake is collected and washed with acetone and benzene.

The washed product is extracted from the aqueous acetone filtrate with benzene. The solvents removed from the extract containing the desired product by distillation at atmospheric pressure. The product itself is fractionated through a packed column to give a 94 g. yield. 263 g. of starting material is recovered. The product is crystallized from 600 cc. of Skellysolve C to give 91 g. of material melting 177–178.5° C. The product, p-fluorosulfonylacetophenone, has the formula

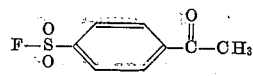

To a stirred solution of 202.2 g. of p-fluorosulfonylacetophenone in 700 cc. of glacial acetic acid there is added slowly 159.8 g. of bromine. After the first 15 drops of bromine are added, a period of about 13 minutes elapses before the bromine is decolorized. The bromination is continued at such a rate that the reaction temperature is maintained at or below 30° C. Crystals separate from the reaction mixture towards the end of the bromination. The resulting slurry is poured into 3 l. of ice and water. The white crystals are filtered, collected and dried. The yield is 257 g. of product having a melting range of from 103 to 108.5° C. This crude product is crystallized from 400 cc. of benzene to give 188 g. of material, M. P. 108–110° C. A further quantity of product can be obtained by recrystallizing the residue obtained from the benzene filtrate. The product of this reaction is p-fluorosulfonylphenacyl bromide, whose formula is as follows:

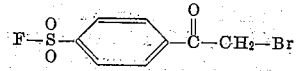

Anal. Calcd. for C₈H₆BrFO₃S: C, 34.18; H, 2.15; Br, 28.43. Found: C, 34.30; H, 2.27; Br, 28.32.

A suspension of 180 g. of p-fluorosulfonylphenacyl bromide in 1 liter of anisole is stirred at normal room temperature as 95 g. of powdered hexamethylenetetramine is added. The mixture is stirred for a period of one hour during which time the temperature of the reaction mixture rises to 38° C. The resulting slurry is poured into stirred ice water which contains 300 g. of sulfur dioxide dissolved in it. The desired product separates as a white powder. It is filtered, collected, washed with ethanol and dried. The yield of p-[(hydroxymethylamino)acetyl]benzenesulfonyl fluoride sulfite is 186 g. A further 61 g. of product is obtained from the aqueous layer of the filtrate by allowing it to evaporate. The formula of this product is

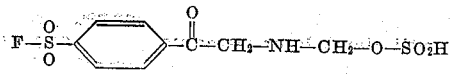

To a stirred suspension of 245 g. of p-[(hydroxymethylamino)acetyl]benzenesulfonyl fluoride sulfite in 200 cc. of concentrated hydrochloric acid there is added 400 cc. of absolute ethanol. The reaction mixture is refluxed for a period of one hour. During this period most of the solid dissolves. On cooling the mixture crystals separate. These are filtered, collected, and washed with absolute ethanol. The filtrate is concentrated to give more product. The yield of product in the form of light tan needles is 136 g. The product, p-(aminoacetyl)benzenesulfonyl fluoride hydrochloride, has the formula:

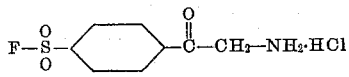

A suspension of 136 g. of p-(aminoacetyl)benzenesulfonyl fluoride, hydrochloride, in 350 cc. of dichloroacetyl chloride is maintained at reflux temperature for a period of one hour. The solid dissolves with evolution of hydrogen chloride gas. The resulting solution is cooled in an ice bath. A solid impurity separates and is removed from the system. The desired product, p-[(alpha,alpha - dichloroacetamido)acetyl]benzenesulfonyl fluoride, is obtained from the filtrate by concentrating and diluting with benzene and Skellysolve C.

The yield of the crude fluoride is 71 g. This is crystallized from benzene to give 57 g. of tan needles melting at 136° C. and solidifying with melting taking place at 148.5–150° C. The product has the following formula:

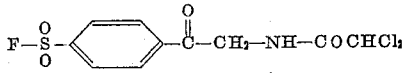

Anal. Calcd. for $C_{10}H_8Cl_2FNO_4S$: C, 36.60; H, 2.46; Cl, 21.61. Found: C, 36.89; H, 2.74; Cl, 21.72.

A suspension of 3.28 g. of p-[(alpha,alpha-dichloroacetamido)acetyl]benzenesulfonyl fluoride in 12 cc. of 95% ethanol containing 0.2 g. of sodium bicarbonate and 3.5 cc. of 36–37% aqueous formaldehyde is stirred at a temperature of 35° C. for a period of 30 minutes. External heating is discontinued. Stirring is continued for an additional two hours. The solution is then diluted with 250 cc. of ice and water. The introduction of water drives out a gum which crystallizes on standing. The yield of crystalline product is 2.43 g., M. P. 117–122° C. This is crystallized from 14 cc. of ethylene dichloride to give 1.30 g., M. P. 133–134° C. The product, p-[alpha-(alpha,alpha - dichloroacetamido) - beta-hydroxypropionyl]benzenesulfonyl fluoride, has the structural formula

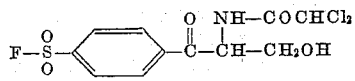

Anal. Calcd. for $C_{11}H_{10}Cl_2FNO_5S$: C, 36.88; H, 2.81. Found: C, 36.95; H, 3.16.

A solution of 1 g. of p-[alpha-(alpha,alpha - dichloroacetamido) - beta - hydroxypropionyl]benzenesulfonyl fluoride in 25 cc. of warm isopropyl alcohol is added to a solution of 1 g. of aluminum isopropoxide in 35 cc. of isopropyl alcohol. The mixture is refluxed beneath a packed distilling column as distillate is taken from the top of the column over a period of one and one-half hours. The residue, yellowish in color, is further concentrated under reduced pressure until about 20 cc. remains. The yellow gum is diluted with 45 cc. of 5% hydrochloric acid and cooled in ice. The gum is extracted from the acid solution with ethyl acetate, dried and concentrated under reduced pressure. The residue is dissolved in ethylene dichloride. Carbon tetrachloride is added to the ethyl dichloride extract until a precipitate appears. The crystals, which separate on standing, are (dl)-threo-1-(p - fluorosulfonyl)-2-(alpha,alpha - dichloroacetamido)-1,3-propanediol. The yield is 0.46 g. melting 159–163° C. A 0.42 g. portion crystallized from 30 cc. ethylene dichloride gave white prisms melting 167–168° C.

Anal. Calcd. for $C_{11}H_{12}Cl_2FNO_5S$: S, 8.91. Found: S, 8.82.

(dl)-Threo-1-(p - fluorosulfonyl)-2-(alpha,alpha - dichloroacetamido) - 1,3 - propanediol has given evidence of great value as an antibacterial agent against such microorganisms as *Salmonella typhimurium*, *streptococcus agalactiae*, and *Staphylococcus aureus*.

Example 2

Preparation of (d)-threo-1-(p-fluorosulfonyl)-2-(alpha,alpha - dichloroacetamido) - 1,3 - propanediol

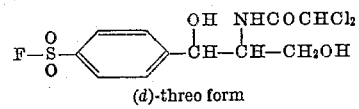

(d)-threo form

The intermediate compound in this synthesis, the monosuccinyl derivative of (dl)-threo-1-(p-fluorosulfonylphenyl)-2-(alpha,alpha - dichloroacetamido)-1,3-propanediol, is prepared according to the following procedure:

A mixture of 36 g. of (dl)-threo-1-(p-fluorosulfonylphenyl) - 2 - (alpha,alpha - dichloroacetamido)-1,3-propanediol and 10 g. of succinic anhydride is finely pulverized and heated to a temperature of 140° C. while being stirred. The mixture is heated for a period of five hours. It is then cooled. The residue is suspended in water. Sodium bicarbonate is added to the aqueous suspension until the pH is 7.5.

The resulting solution is filtered to free it of any insoluble residue. The solution is made acid with dilute hydrochloric acid. During the acidification, the solution is stirred and surrounded by an ice bath. The desired monosuccinyl compound crystallizes from the solution.

To a stirred solution of 4.6 g. of the acid monosuccinyl derivative of (dl)-threo-1-(p-fluorosulfonylphenyl) - 2 - (alpha,alpha - dichloroacetamido)-1,3-propanediol in 30 cc. of acetone, there is added slowly a solution of 3.34 g. of strychnine in 20 cc. of chloroform. The salt is obtained by concentrating the solution. The salt is fractionally crystallized from a mixture of chloroform and acetone to give the (l)-strychnine salt of the monosuccinyl derivative of (l)-threo-1-(p - fluorosulfonylphenyl) - 2 - (alpha,alpha-dichloroacetamido)-1,3-propanediol and the (l)-strychnine salt of the monosuccinyl derivative of (d)-threo - 1 - (p-fluorosulfonylphenyl)-2-(alpha,alpha - dichloroacetamido)-1,3-propanediol.

The (l)-strychnine salt of the monosuccinyl derivative of (d) - threo-1-(p-fluorosulfonylphenyl) - 2 - (alpha,alpha-dichloroacetamido)-1,3-propanediol is dissolved in a small amount of water and made acid to Congo red paper with dilute sulfuric acid. The monosuccinyl derivative of (d)-threo-1-(p-fluorosulfonylphenyl)-2-(alpha,alpha-dichloroacetamido - 1,3 - propanediol separates as crystals. The crystalline material is converted to (d)-threo-1-(p-fluorosulfonylphenyl) - 2 - (alpha,alpha - dichloroacetamido-1,3-propanediol by warming in 0.1 N hydrochloric acid.

Example 3

Preparation of (l)-threo-1-(p-fluorosulfonylphenyl)-2-(alpha,alpha-dichloroacetamido-1,3-propanediol

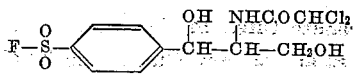

(l)-threo form

The (l)-strychnine salt of the monosuccinyl derivative of (l)-threo-1-(p - fluorosulfonylphenyl) - 2 - (alpha,alpha-dichloroacetamido) - 1,3-propanediol (prepared in Example 2) is dissolved in water and made acid to Congo red paper with dilute sulfuric acid. The monosuccinyl derivative of (l)-threo-1-(p-fluorosulfonylphenyl) - 2 - (alpha,alpha-dichloroacetamido) - 1,3-propanediol separates from the solution. This is converted to (l)-threo-1-(p-fluorosulfonylphenyl) - 2 - (alpha,alpha-dichloroacetamido)-1,3-propanediol by warming with 0.1 N hydrochloric acid.

I claim:
1. A compound of the formula,

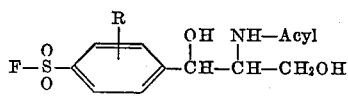

where R is a member of the class consisting of hydrogen, halogen, lower alkyl and lower alkoxy radicals and acyl is a member of the class consisting of acetyl, chloroacetyl, bromoacetyl, dichloroacetyl and dibromoacetyl radicals.

2. (dl)-Threo - 1 - (p-fluorosulfonylphenyl)-2 - (alpha,alpha - dichloroacetamido) - 1,3 - propanediol.

3. (d) Threo - 1 - (p-fluorosulfonylphenyl)-2-(alpha,alpha - dichloroacetamido)-1,3-propanediol.

4. (l)-Threo - 1 - (p-fluorosulfonylphenyl)-2-(alpha,alpha - dichloroacetamido)-1,3-propanediol.

5. A process which comprises the steps of (1) mixing a fluorosulfonylethyl benzene of the formula

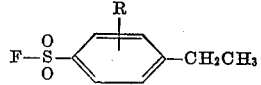

where R is a member of the class consisting of hydrogen, halogen, lower alkyl and lower alkoxy radicals, with potassium permanganate and magnesium nitrate, whereby a compound of the formula

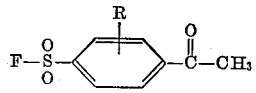

is obtained; (2) adding to a solution of the latter compound a halogenating agent, whereby a phenacyl halide of the formula

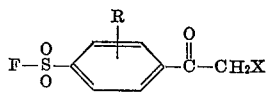

is produced, where X is a member of the class consisting of chloro, bromo and iodo radicals;

(3) mixing the phenacyl halide thus produced with hexamethylenetetramine in a liquid medium; (4) effecting conversion of the resulting hexamethylenetraminium halide to a benzenesulfonyl fluoride sulfite of the formula

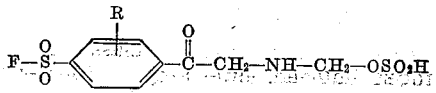

using sulfur dioxide and water; (5) hydrolyzing the sulfite with a mineral acid to obtain a salt of the amine of the formula

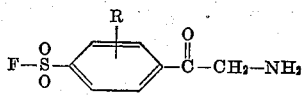

(6) N-acylating the latter compound with an acyl halide in the absence of an acid acceptor to produce a compound of the formula

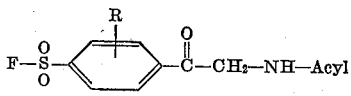

where acyl is a member of the class consisting of acetyl, chloroacetyl, bromoacetyl, dichloroacetyl and dibromoacetyl radicals; (7) mixing the latter compound in the presence of a weak inorganic base with formaldehyde, whereby a compound of the formula

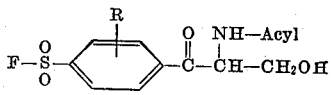

is obtained; (8) effecting chemical reaction between the latter compound and a member of the group consisting of aluminum isopropoxide and sodium borohydride and recovering a compound of the formula

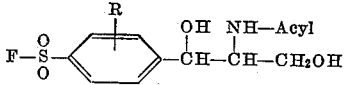

6. In a process for obtaining (dl)-threo-1-(p-fluorosulfonylphenyl)-2-(alpha,alpha - dichloroacetamido)-1,3-propanediol, the steps comprising mixing p-ethylbenzenesulfonyl fluoride with magnesium nitrate and potassium permanganate, recovering p-fluorosulfonylacetophenone thus formed, brominating the latter compound with bromine in the presence of glacial acetic acid to obtain p-fluorosulfonylphenacyl bromide, mixing the latter compound with hexamethylenetetramine and subsequently with sulfur dioxide and water to obtain p - [(hydroxymethylamino)-acetyl]benzenesulfonyl fluoride sulfite, hydrolyzing the latter compound so obtained with hydrochloric acid, recovering the p-(aminoacetyl)-benzenesulfonyl fluoride,hydrochloride, N-acylating the latter compound with dichloroacetyl chloride to obtain p-[(alpha,alpha - dichloroacetamido)-acetyl]benzenesulfonyl fluoride, mixing the latter compound so obtained with aqueous formaldehyde in a dilute alkaline solution, recovering p-[alpha-(alpha,alpha - dichloroacetamido) - beta - hydroxypropionyl]benzenesulfonyl fluoride, reducing the latter compound with aluminum isopropoxide in the presence of isopropyl alcohol, and recovering (dl)-threo-1-(p-fluorosulfonylphenyl)-2-(alpha,alpha - dichloroacetamido)-1,3-propanediol.

7. In a process for the preparation of a compound of the formula

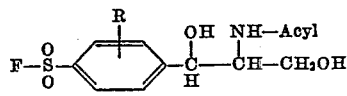

where R is a member of the class consisting of hydrogen, halogen, lower alkyl and lower alkoxy radicals the step comprising mixing a compound of the formula

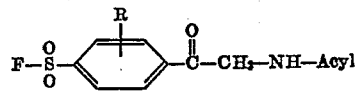

with formaldehyde in the presence of a weak inorganic base, whereby hydroxymethylation occurs to give a compound of the formula

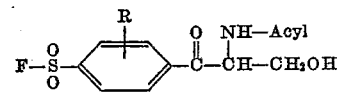

References Cited in the file of this patent

Long et al., "J. Am. Chem. Soc.," vol. 71, July 1949, pp. 2473–5.